(No Model.)

S. HALLIGAN.
BICYCLE TOE CLIP.

No. 596,810. Patented Jan. 4, 1898.

WITNESSES:
Edward Thorpe

INVENTOR
S. Halligan.
BY
ATTORNEYS.

UNITED STATES PATENT OFFICE.

SAMUEL HALLIGAN, OF PERTH AMBOY, NEW JERSEY, ASSIGNOR OF TWO-THIRDS TO CHARLES A. DUNHAM AND JOSEPH B. MAYO, OF SAME PLACE.

BICYCLE TOE-CLIP.

SPECIFICATION forming part of Letters Patent No. 596,810, dated January 4, 1898.

Application filed November 9, 1896. Serial No. 611,520. (No model.)

*To all whom it may concern:*

Be it known that I, SAMUEL HALLIGAN, of Perth Amboy, in the county of Middlesex and State of New Jersey, have invented a new and Improved Bicycle Toe-Clip, of which the following is a full, clear, and exact description.

The object of my invention is to so construct a bicycle toe-clip that when the clip is placed in position upon a bicycle-pedal the said clip will automatically assume and maintain a horizontal balanced position or a position that will enable the rider to quickly locate the toe in the clip.

A further object of the invention is to construct the balanced toe-clip in a simple, durable, and economic manner, and so that it will be capable of application to any kind of pedal, and will also be capable of adjustment to the pedal, so as to balance the same together with its return-section.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
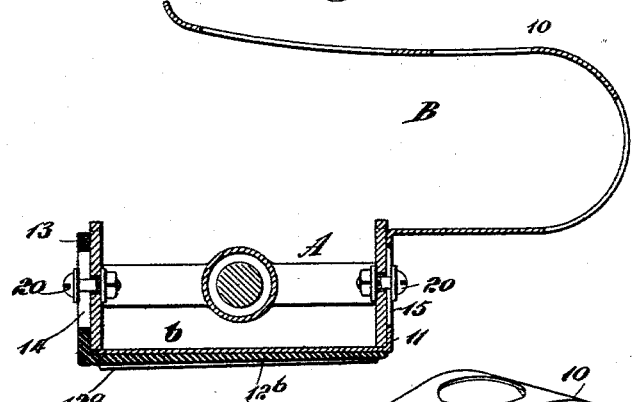
Figure 2:
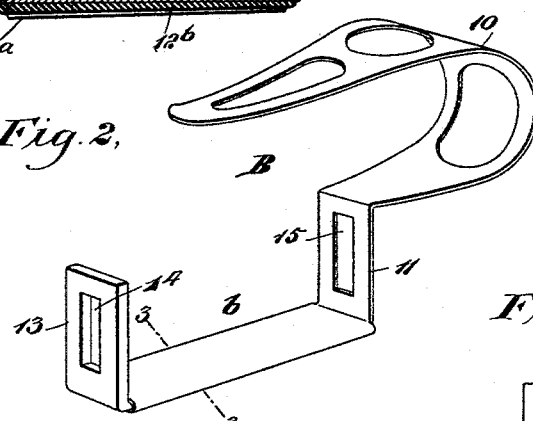
Figure 3:
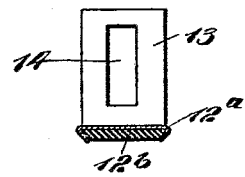
Figure 4:
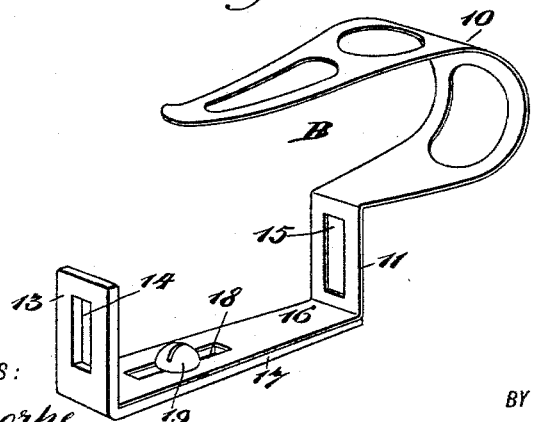

Figure 1 is a section through a bicycle-pedal and through the improved toe-clip applied to the pedal. Fig. 2 is a perspective view of the improved toe-clip. Fig. 3 is a transverse section on the line 3 3 of Fig. 2, and Fig. 4 is a perspective view of a slightly-modified form of the toe-clip.

The pedal A may be of any desired construction, and the toe-clip B is provided with the ordinary return-section 10, into which the toe of the boot or shoe is to be introduced. A vertical member 11 is projected downward from the inner end of the lower portion of the return-section 10, and the said vertical member 11 is connected by a horizontal member $b$ with an upwardly-extending member 13. The upwardly-extending member 13 is provided with a longitudinal slot 14, and the opposing vertical member 11 has a similar slot 15 made therein. The space between the two vertical members 11 and 13 is such that the pedal A may be fitted between these two members and engage with the bottom or horizontal member $b$. The two vertical members 11 and 13, the horizontal member $b$, and the return-section 10 may be made in one piece, if desired, but in any event the rear member 13 is much heavier than the other members and the weight is so calculated that it will balance the pedal and the return-section of the toe-clip, together with the vertical member 11 and horizontal member $b$, compelling the toe-clip and the pedal when released from the foot to assume a position which will enable the foot to be readily introduced into the said clip, bringing the pedal to the upper horizontal position and the toe-clip to the same position.

The toe-clip is attached to the pedal preferably by means of bolts 20, which are passed through the slots 14 and 15 in the vertical members of the toe-clip, as shown in Fig. 1, and by adjusting the rear vertical member 13 upward or downward the weight of the toe-clip may be so distributed on the pedal as to perfectly balance the same. Preferably that portion of the toe-clip which receives the pedal A is made in adjustable sections, so that the clip may accommodate itself to different sizes of pedals.

In Figs. 1, 2, and 3 I have illustrated a horizontal slideway $12^a$ as constituting one section of the horizontal member $b$, the slideway $12^a$ being secured to the forward upright member 11, and in this slideway an arm $12^b$ has movement, which arm is attached to and forms a portion of the rear upright member 13 of the toe-clip. The slideway $12^a$ is preferably made from sheet metal, while the arm $12^b$, which moves in the slideway, is made preferably of a heavier material. The preponderance of weight, however, in any event is at the rear end of the toe-clip.

In Fig. 4 I have illustrated a modified construction of the laterally-adjustable toe-clip, in which an arm 16 is projected from the upright or vertical member 11 and is held to slide upon a second arm 17, projected oppositely from the vertical member or upright 13. Each of the arms 16 and 17 is provided with a longitudinal slot 18, and the two arms are slidably and adjustably connected by means of a bolt 19, a set-screw, or its equivalent.

Having thus described my invention, I claim as new and desire to secure by Letters Patent—

1. A toe-clip for bicycles, consisting of a return-section adapted to receive the toe portion of a boot or shoe, and a body portion connected with the return-section, which body portion comprises two uprights and a connecting-bar uniting the lower portion of the uprights, each upright having a longitudinal slot produced therein, the upright farthest removed from the return-section being weighted, and means for attaching the uprights to the pedal of a bicycle, as and for the purpose specified.

2. A bicycle toe-clip, consisting of a return-section, a body-section comprising uprights and a bar connecting the uprights, one of the uprights being attached to the return-section and the opposite upright being weighted, and means for adjusting the uprights on the bicycle-pedal, substantially as shown and described.

3. A bicycle toe-clip, consisting of a return-section, a body-section attached to the return-section and comprising two uprights, one attached to the return-section and the opposite upright being weighted, a sectional connecting-bar uniting the said uprights, whereby the uprights may be adjusted to or from each other, and means for locking the sections of the connecting-bar, as and for the purpose set forth.

4. A toe-clip having a returned portion to receive the toe of the rider, and a body-section with two perpendicular portions, and a connecting-bar at the lower ends of the perpendicular portions, one of the perpendicular portions being attached to the returned portion and the connecting-bar being capable of extending transversely across the under side of the pedal while the vertical portions are respectively capable of being connected with the side plates of the pedal, substantially as described.

SAMUEL HALLIGAN.

Witnesses:
LUCY V. DUNHAM,
FREDRICH MEYER.